(12) United States Patent
Isobe et al.

(10) Patent No.: US 8,287,273 B2
(45) Date of Patent: Oct. 16, 2012

(54) METHOD OF AND APPARATUS FOR CHANGING COLORS OF INJECTION MOLDING HOT RUNNER DIE

(75) Inventors: Hiroaki Isobe, Kumamoto (JP); Kouji Takamura, Kumamoto (JP); Masaaki Matsuda, Kumamoto (JP)

(73) Assignee: Honda Motor Co., Ltd., Tokyo (JP)

( * ) Notice: Subject to any disclaimer, the term of this patent is extended or adjusted under 35 U.S.C. 154(b) by 1608 days.

(21) Appl. No.: 11/464,346

(22) Filed: Aug. 14, 2006

(65) Prior Publication Data
US 2007/0045900 A1    Mar. 1, 2007

(30) Foreign Application Priority Data

Aug. 30, 2005 (JP) ................. 2005-249515

(51) Int. Cl.
*A23P 1/00* (2006.01)
*B29B 11/06* (2006.01)
*A21C 3/00* (2006.01)
*B29B 7/00* (2006.01)
*B29C 45/00* (2006.01)

(52) U.S. Cl. ........ 425/575; 425/130; 425/182; 425/185; 425/186; 425/190; 425/547; 425/567; 425/568; 425/570; 425/571; 425/572; 425/573; 425/574; 264/328.8

(58) Field of Classification Search .............. 264/328.8; 425/574, 575, 190, 130, 182, 185, 186, 547; 425/567, 568, 570, 571, 572, 573
See application file for complete search history.

(56) References Cited

U.S. PATENT DOCUMENTS

| 4,699,581 A | * | 10/1987 | Nagasaka et al. ............ 425/155 |
| 5,935,616 A | * | 8/1999 | Gellert et al. .................. 425/130 |
| 6,776,600 B1 | * | 8/2004 | Zahoransky et al. ......... 425/130 |
| 2005/0163883 A1 | * | 7/2005 | Yang ............................. 425/570 |

FOREIGN PATENT DOCUMENTS

| JP | 05-064828 | 3/1993 |
| JP | 2001-277283 | 10/2001 |

* cited by examiner

*Primary Examiner* — Christina Johnson
*Assistant Examiner* — Atul P Khare
(74) *Attorney, Agent, or Firm* — Rankin, Hill & Clark LLP

(57) ABSTRACT

A color changing apparatus of an injection molding hot runner die which is simple in construction and easily capable of changing colors for molding products without removing and replacing a hot runner. In the apparatus, a passage for supplying a melted resin to a molding die, a divided type hot runner block is provided with hot runners each for exclusive use of each of molding colors, sprues and nozzles being in communication with the hot runners. A moving device is provided for moving the molding die, which is united with the divided type hot runner block, along with the divided type hot runner block. A positioning device is adapted to place the molding die in position in a state where either of the sprues of the divided type hot runner block is moved by the moving device to a position opposed to an injection nozzle for injecting the melted resin.

6 Claims, 4 Drawing Sheets

METHOD OF AND APPARATUS FOR CHANGING COLORS OF INJECTION MOLDING HOT RUNNER DIE

BACKGROUND OF THE INVENTION

1. Technical Field

The present invention relates to a method of and an apparatus for changing colors of an injection molding hot runner die provided with a hot runner which serves as a passage for supplying a melted resin from an injection device to a molding die.

2. Related Art

Heretofore, in an injection machine provided with a hot runner which serves as a passage for supplying a melted resin from an injection device to a molding die, there is known, as a device for changing colors for molding products, a hot runner changing apparatus which comprises a support means for supporting a plurality of hot runners in the state of being placed side by side, a rotation means for rotating a pivotal shaft of the support means, and a fore-and-aft movement means for moving front ends of the hot runners forward and backward (for example, see Japanese patent application publication 5-64828).

Also, there is known an injection molding machine for changing colors for molding products which has two or more plasticizing devices for melting a resin supplied from outside and injecting the melted resin into a molding die. In this injection molding machine, at least one of the plasticizing devices is maintained in an operative position in which it supplies the resin from outside into the molding die while other plasticizing devices are maintained in a stand-by position in which they stand away from the operative position, such that each of the plasticizing devices is capable of switching its position from the stand-by position to the operative position or from the operative position to the stand-by position (see Japanese patent application publication 2001-277283).

However, the hot runner changing apparatus as described in Japanese patent application publication 5-64828 requires the supporting means for supporting the plurality of hot runners in the state of being placed side by side and the rotation means for rotating the pivotal shaft, or the like, so that it becomes complicated in construction and large in scale.

Also, the injection molding machine as described in Japanese patent application publication 2001-277283 requires two or more plasticizing devices thereby incurring an increase in size of equipment.

The present invention is made in view of such disadvantages as seen in the conventional art of injection molding and has its object to provide a method of and an apparatus for changing colors of an injection molding hot runner die which are simple in construction and capable of easily performing a color change for molding products without removing and replacing a hot runner.

SUMMARY OF THE INVENTION

To achieve the above described object, according to one aspect of the present invention, there is provided a method of changing colors of an injection molding hot runner die which has a passage for supplying a melted resin to a molding die, comprising the steps of moving the molding die, which is united with a hot runner block having hot runners each provided for exclusive use of each of molding colors, along with the hot runner block, and positioning the molding die in a state where one of sprues of the hot runner block is moved by the step of moving the molding die to a position opposed to an injection nozzle which injects the melted resin. The molding die united with the hot runner block is moved along with the hot runner block and positioned such that the sprue for a desired color is in an opposed position to the injection nozzle which injects the melted resin, and the color change for the molding product can be easily performed merely through such processes.

According to another aspect of the present invention, there is provided an apparatus for changing colors of an injection molding hot runner die which has a passage for supplying a melted resin to a molding die, comprising a hot runner block which is provided with hot runners for exclusive use of each of molding colors, sprues and nozzles being in communication with the hot runners, a moving means for moving the molding die, which is united with the hot runner block, along with the hot runner block, and a positioning means for positioning the molding die in a state where one of the sprues of the hot runner block is moved by the moving means to a position opposed to an injection nozzle which injects the melted resin. The molding die united with the hot runner block is moved along with the hot runner block by the moving means and positioned by the positioning means such that the sprue for a desired color is in an opposed position to the injection nozzle which injects the melted resin, and thereby the color change for the molding product can be easily performed.

According to yet another aspect of the present invention, in the color changing apparatus of an injection molding hot runner die of the second aspect, the hot runner block is an integral type hot runner block which has a plurality of hot runners. Further, the hot runner block can be compact corresponding to the molding die.

According to a further aspect of the present invention, in the color changing apparatus of an injection molding hot runner die of the second aspect, the hot runner block is a divided type hot runner block in which hot runner blocks each having one hot runner are separately formed at a predetermined interval. The separately-formed hot runner blocks each having one hot runner are in parallel at a predetermined interval, so that the hot runner block that is not in operation can be kept away from the heat, and a scorched resin will not come out of the hot runner block that is not in operation.

According to another aspect of the present invention, in the color changing apparatus of an injection molding hot runner die of any one of the second, third, and fourth aspect, the sprues formed in the hot runner block are capable of being arranged at an optional interval from each other. The sprues formed in the hot runner block are capable of being arranged at an optional interval, whereby it is possible to shorten a working time for changing the position of the molding die.

DETAILED DESCRIPTION OF THE INVENTION

Figure 1:
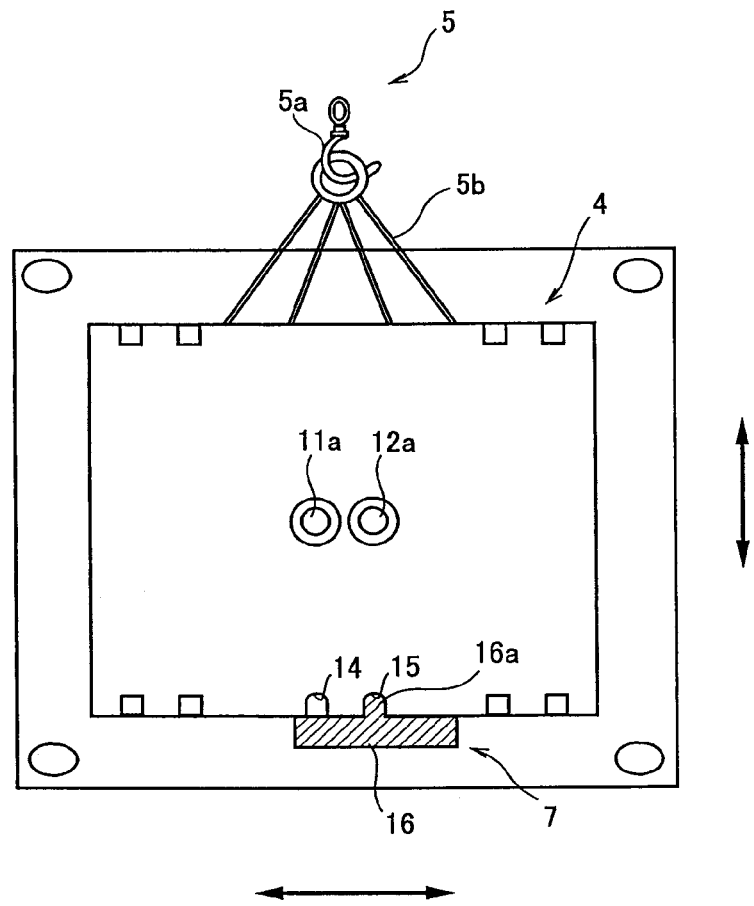
FIG. 1 is a schematic elevational view of a color changing apparatus of an injection molding hot runner die according to the present invention.
Figure 2:
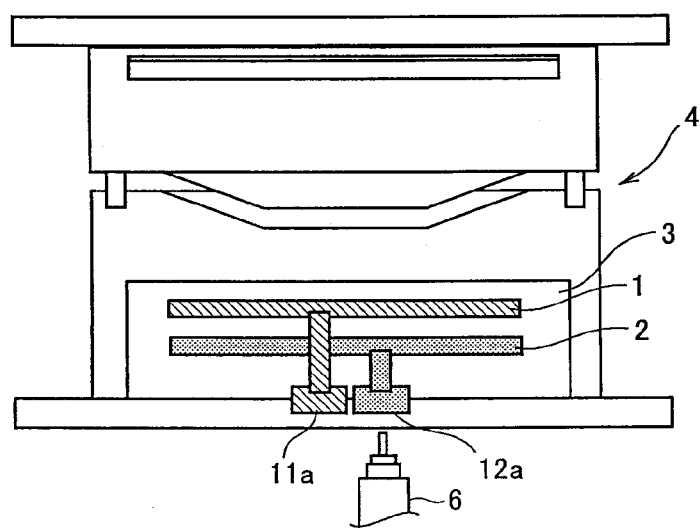
FIG. 2 is a schematic sectional plan view of the color changing apparatus of the injection molding hot runner die according to the present invention.
Figure 3:
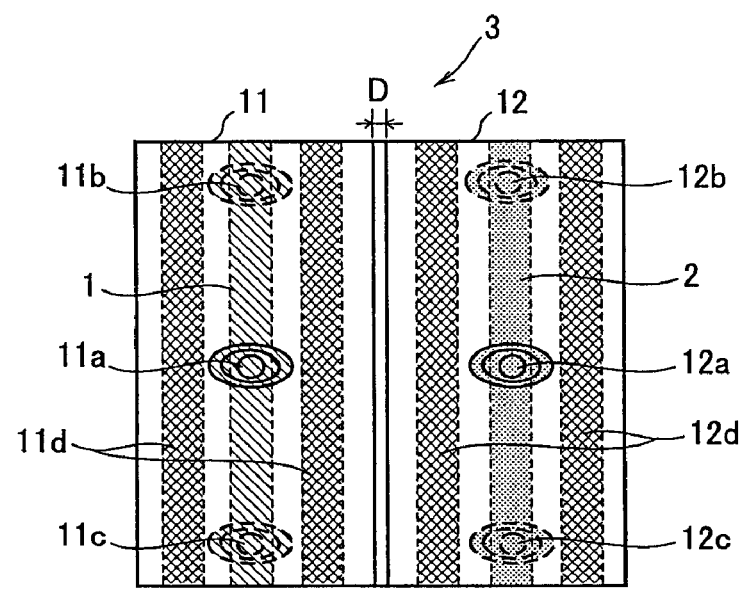
FIG. 3 is an elevational view of a divided type hot runner block.
Figure 4:
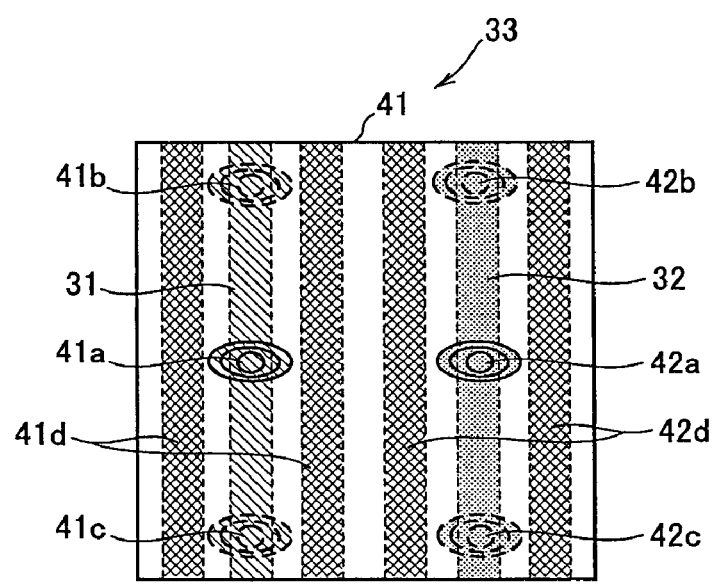
FIG. 4 is an elevational view of an integral type hot runner block.
Figure 5:
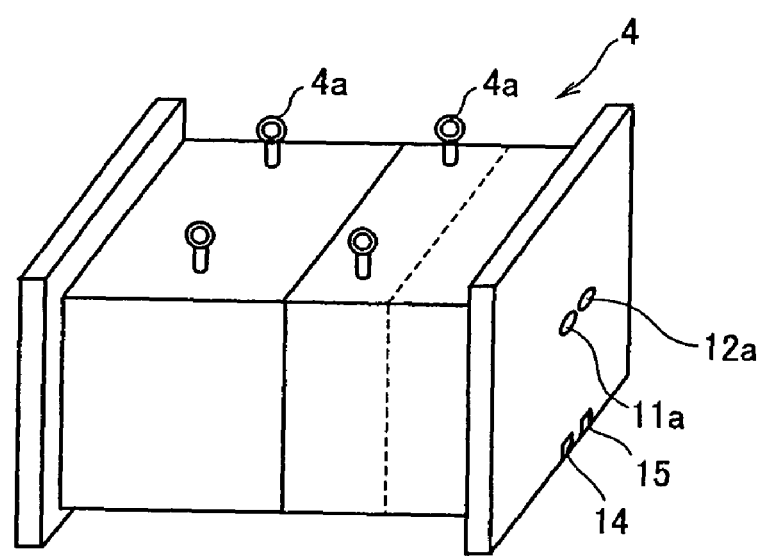
FIG. 5 is a perspective view of a molding die which is united with the divided type hot runner block.
Figure 6:
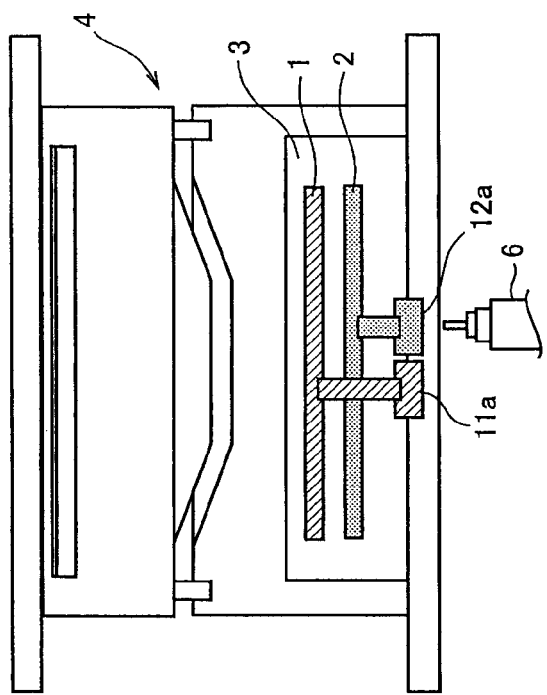
FIG. 6 is an explanatory view of an operation.
Figure 6:
Figure 6:
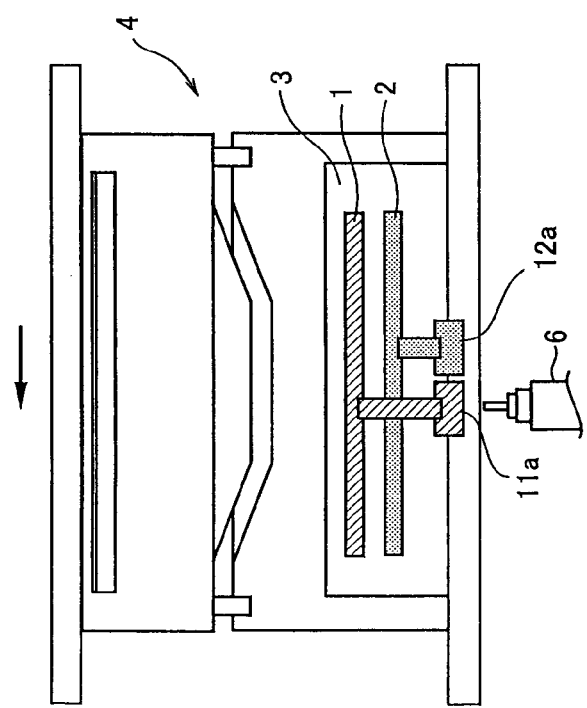

Hereinafter, the embodiments of the present invention will be explained with reference to the accompanying drawings, wherein FIG. 1 is a schematic elevational view of a color changing apparatus of an injection molding hot runner die according to the present invention, FIG. 2 is a schematic plan view partly in section of the same apparatus, FIG. 3 is an elevational view of a divided type hot runner block, FIG. 4 is an elevational view of an integral type hot runner block, FIG. 5 is a schematic perspective view of a molding die which is united with the divided type hot runner block, and FIG. 6 is an explanatory view for explaining the operation.

As shown in FIG. 1 and FIG. 2, the color changing apparatus of the injection molding hot runner die according to the present invention comprises a horizontally-installed hot runner block 3 of a divided type provided with two independent runners 1, 2, a molding die 4 united with the divided type hot runner block 3, a moving means 5 for moving the molding die 4 along with the divided type hot runner block 3, and a positioning means 7 for positioning the molding die 4 in a state where either of sprues 11a and 12a of the divided type hot runner block 3 is moved by the moving means 5 to a position opposed to an injection nozzle 6 which injects a melted resin. The injection nozzle 6 is fixedly placed in its position.

The divided type hot runner block 3, as shown in FIG. 3, is comprised of two separately-formed hot runner blocks 11 and 12 which are in parallel at a predetermined interval D. In the hot runner block 11, there are provided the afore-mentioned runner 1, the afore-mentioned sprue 11a which is in communication with the runner 1 so as to supply the melted resin thereto, two nozzles 11b, 11c for injecting the melted resin into the molding die 4, and two heaters 11d, 11d extending along and being placed on both sides of the runner 1. Also, in the other hot runner block 12, there are provided the afore-mentioned runner 2, the afore-mentioned sprue 12a being in communication with the runner 2 to supply the melted resin thereto, two nozzles 12b, 12c for injecting the melted resin into the molding die 4, and two heaters 12d, 12d extending along and being placed on both sides of the runner 2. The hot runners 1, 2 are formed by the runners 1, 2 and the heaters 11d, 12d which heat the melted resin passing through the runners 1, 2.

An integral type hot runner block 33 as shown in FIG. 4 can be used instead of the divided type hot runner block 3. The integral type hot runner block 33 is comprised of two hot runners 31, 32, and an integrally-formed block 41. On a side of the block 41, there are provided the afore-mentioned runner 31, a sprue 41a being in communication with the runner 31 to supply the melted resin thereto, two nozzles 41b, 41c for injecting the melted resin into the molding die 4, and two heaters 41d, 41d extending along and being placed on both sides of the runner 31. On the other side of the block 41, there are provided the afore-mentioned runner 32, a sprue 42a being in communication with the runner 32 to supply the melted resin thereto, two nozzles 42b, 42c for injecting the melted resin into the molding die 4, and two heaters 42d, 42d extending along and being placed on both sides of the runner 32. The hot runners 31, 32 are formed by the runners 31, 32 and the heaters 41d, 42d which heat the melted resin passing through the runners 31, 32.

In these embodiments, each of the hot runners is provided for exclusive use of each of molding colors. Therefore, when the two hot runners 1, 2 are used, it is possible to choose two greatly different colors such as red and black, whereby the loss by color changing may be reduced. Further, instead of the horizontally-installed hot runner block 3 of a divided type in which the hot runner blocks 11, 12 are placed side by side in a horizontal direction and the sprues 11a, 12a are arranged in a horizontal direction, it is possible to use a vertically-installed hot runner block of a divided type in which the hot runner blocks 11, 12 are placed in a vertical direction and the sprues 11a, 12a are arranged in a vertical direction.

Examples of the moving means 5 include a crane (not shown in the drawings). As shown in FIG. 1 and FIG. 5, hooks 4a provided on the molding die 4 are connected through wires 5b with a hook 5a of the crane 5, and the molding die 4 is moved in a state of being hoisted with the crane 5. Then, either of the sprues 11a, 12a provided in the divided type hot runner block 3 can be moved by the moving means 5 to a position opposed to the injection nozzle 6.

The positioning means 7, as shown in FIG. 1, comprises two cutout portions 14, 15 formed on the flanged edge of the molding die 4, a positioning block 16 provided with a projection 16a to be engaged with the cutout portions 14, 15, and a molding die fixing means (not shown in the drawings) for fixing the molding die 4 in position. The positioning block 16 is fixed on a base (not shown in the drawings). When the projection 16a enters into engagement with the cutout portion 14, a center of axis of the sprue 11a is in alignment with a center of axis of the injection nozzle 6. When the projection 16a enters into engagement with the other cutout portion 15, a center of axis of the sprue 12a comes to be in alignment with the center of axis of the injection nozzle 6.

In this way, in cooperation between either of the cutout portions 14, 15 and the positioning block 16 provided with the projection 16a, either of the sprues 11a, 12a provided in the divided type hot runner block 3 can be positioned so as to be opposed to the injection nozzle 6. Further, the molding die 4 can be fixed by the molding die fixing means in a state where either of the sprues 11a, 12a is opposed to the injection nozzle 6.

The operation of the above-described color changing apparatus of the injection molding hot runner die according to the present invention and a color changing method for the injection molding hot runner die according to the present invention will now be explained as for the case of employing the divided type hot runner block 3. For example, in order to change the molding color from red to black, the injection nozzle 6 is required first to be removed from the sprue 11a of the hot runner block 11 which supplies a red material (melted resin) to the molding die 4 and next to be inserted into the sprue 12a of the hot runner block 12 which supplies a black material (melted resin).

Firstly, the injection nozzle 6 is moved backward to be pulled out of the sprue 11a of the hot runner block 11 which supplies the red material into the molding die 4. Secondly, by connecting the hooks 4a of the molding die 4 with the hook 5a of the crane using the wires 5b, the molding die 4 is hoisted in a vertical direction with the crane. Then, the cutout portion 14 formed in the flanged edge of the molding die 4 is released from the engagement with the projection 16a formed in the positioning block 16.

Next, as shown in FIG. 6, after moving the molding die 4, which is united with the divided type hot runner block 3, in a horizontal direction by operating the crane, the molding die 4 is further moved downward in a vertical direction so as to place the sprue 12a of the hot runner block 12 in an opposed position to the injection nozzle 6 (step of moving molding die).

Then, as shown in FIG. 1, the cutout portion 15 formed in the flanged edge of the molding die 4 enters into engagement with the projection 16a of the positioning block 16.

Next, the molding die 4 is fixed by the molding die fixing means in a state where the cutout portion 15 is engaged with the projection 16a. With this, the molding die 4 is fixed in a state where the center of axis of the sprue 12a provided in the hot runner block 12 is in alignment with the center of axis of the injection nozzle 6 (step of positioning molding die).

Then, the injection nozzle 6 is inserted into the sprue 12a of the hot runner block 12 which supplies the black material to the molding die 4, whereby the color changing operation from red to black in the injection molding hot runner die is completed.

As described above, the color changing method of the molding die is easily performed and the time is shortened merely through the processes of moving the molding die 4 united with the horizontally-arranged hot runner block 3 of a divided type in a horizontal direction and in a vertical direction, and positioning the molding die 4 such that the axial center of either of the sprues 11a, 12a provided in the divided type hot runner block 3 is aligned with the axial center of the injection nozzle 6.

INDUSTRIAL APPLICABILITY

According to the present invention, since the color change for the molding die can be easily performed merely by moving the molding die united with the hot runner block and positioning the molding die in a state where the axial center of one of the sprues provided in the hot runner block is in alignment with the axial center of the injection nozzle, it is possible to provide effective method of and apparatus for changing colors for the molding die in which the time of the color change can be reduced.

What is claimed is:

1. An apparatus for changing colors of an injection molding hot runner die that has a passage for supplying a melted resin to a molding die, said molding die having first and second cutout portions formed therein, the apparatus comprising:
a hot runner block that is provided with first and second hot runners, said first hot runner being exclusively used for a first color and being in communication with a first sprue and a first nozzle, said second hot runner being exclusively used for a second color and being in communication with a second sprue and a second nozzle;
a moving means for moving the molding die, which is united with the hot runner block, along with the hot runner block; and
a positioning block having a projection, said projection being adapted to engage either of said first and second cutout portions, wherein when said projection engages said first cutout portion, a melted resin injection nozzle is aligned with said first sprue, and wherein when said projection engages said second cutout portion, the melted resin injection nozzle is aligned with said second sprue.

2. The apparatus for changing colors of an injection molding hot runner die according to claim 1, wherein the hot runner block is an integral type hot runner block which has a plurality of hot runners.

3. The apparatus for changing colors of an injection molding hot runner die according to claim 2, wherein the hot runner block is a divided type hot runner block in which hot runner blocks each having one hot runner are separately formed at a predetermined interval.

4. The apparatus for changing colors of an injection molding hot runner die according to claim 3, wherein the sprues formed in the hot runner block are capable of being arranged at an optional interval from each other.

5. The apparatus for changing colors of an injection molding hot runner die according to claim 2, wherein the sprues formed in the hot runner block are capable of being arranged at an optional interval from each other.

6. The apparatus for changing colors of an injection molding hot runner die according to claim 1, wherein the sprues formed in the hot runner block are capable of being arranged at an optional interval from each other.

* * * * *